United States Patent [19]

Koto

[11] Patent Number: 4,768,045

[45] Date of Patent: Aug. 30, 1988

[54] INK DROPLET DETECTING APPARATUS

[75] Inventor: Haruhiko Koto, Suwa, Japan

[73] Assignee: Seiko Epson Corporation, Tokyo, Japan

[21] Appl. No.: 917,641

[22] Filed: Oct. 9, 1986

[30] Foreign Application Priority Data

Oct. 9, 1985 [JP] Japan ................................ 60-225750
Oct. 14, 1985 [JP] Japan ................................ 60-228315

[51] Int. Cl.$^4$ .............................................. G01D 15/16
[52] U.S. Cl. .............................................. 346/140 R
[58] Field of Search ............... 346/75, 140 R, 140 PD

[56] References Cited

U.S. PATENT DOCUMENTS 4,067,019 1/1978 Fleischer et al. ..................... 346/75
4,323,908 4/1982 Lee et al. ..................... 346/140 PD
4,368,478 1/1983 Koto ............................ 346/140 PD
4,484,199 11/1984 Watanase ................. 346/140 PD X
4,590,482 5/1986 Hay et al. ................ 346/140 PD X

*Primary Examiner*—J. R. Scott
*Assistant Examiner*—Derek S. Jennings
*Attorney, Agent, or Firm*—Kaplan Blum

[57] ABSTRACT

An ink droplet detecting apparatus for use in conjunction with an ink-on-demand jet printer having a nozzle is provided. A first electrode is disposed at a predetermined position spaced from and facing the nozzle. A second electrode is positioned so that an ink droplet following a correct path will reach the first electrode and change the impedance value between the first and second electrodes. This change in impedance is detected and used in determining the presence of correct ink droplet path. The second electrode may be either positioned facing the nozzle in spaced adjacent relation to the first electrode or within the ink path upstream of the nozzle.

23 Claims, 6 Drawing Sheets

FIG. 3
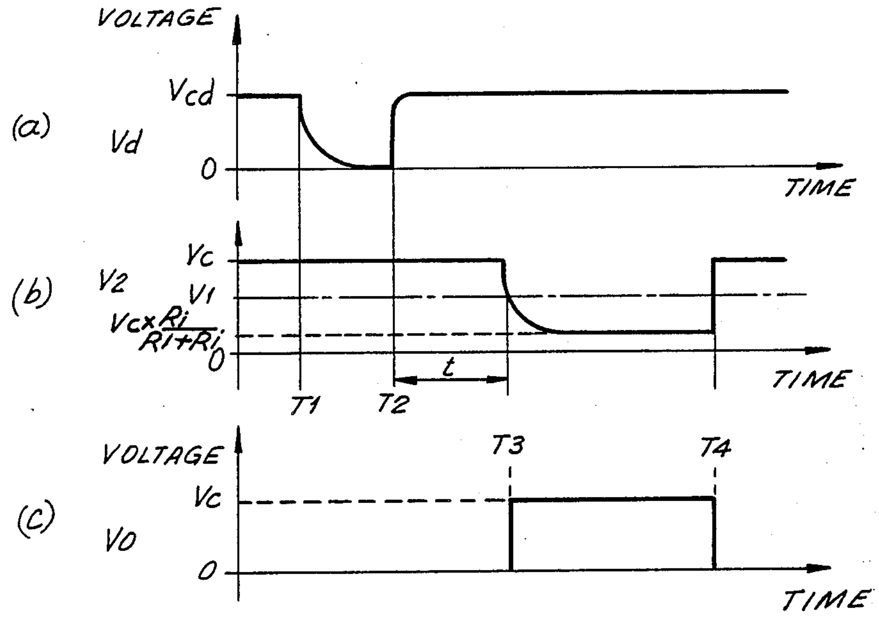
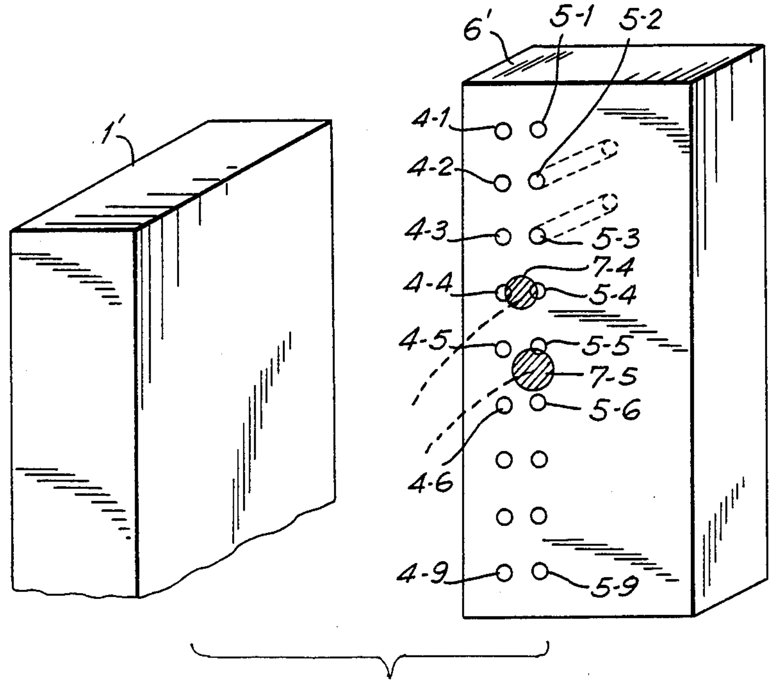
FIG. 4

FIG. 5
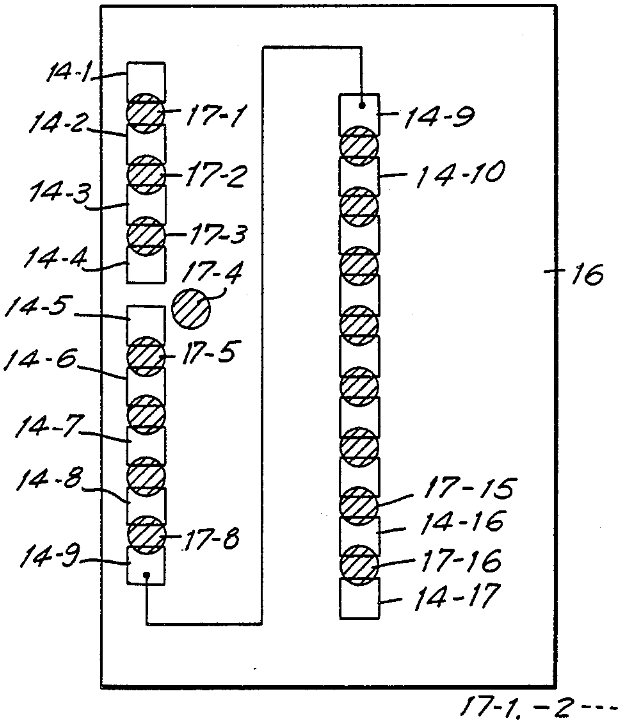
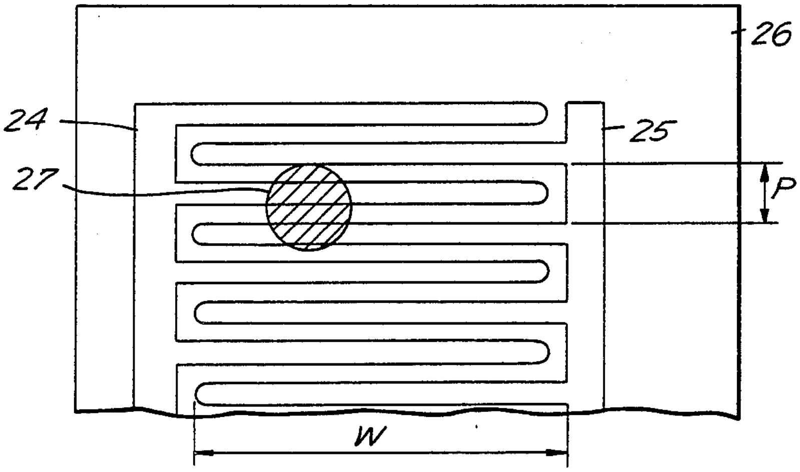
FIG. 6

FIG. 7
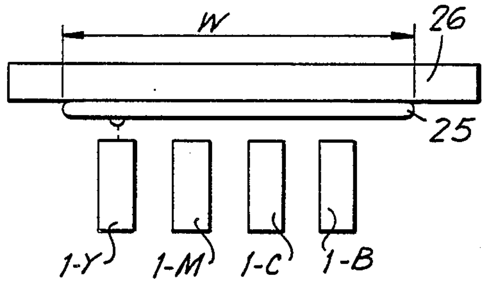
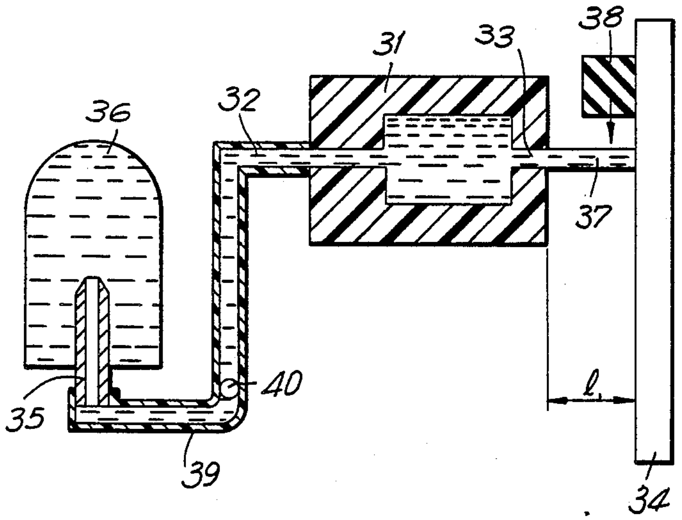
FIG. 8

INK DROPLET DETECTING APPARATUS

BACKGROUND OF THE INVENTION

The present invention relates to an ink droplet detecting apparatus for use in an ink jet printer and in particular, to an apparatus for detecting the flight path and/or speed of an ink droplet.

Ink jet printers, especially ink-on-demand type ink jet printers provide quiet printing, however, they suffer from the disadvantage that the flight of ink dropolets becomes unstable or impossible when the printer is subjected to rough handling. It has been proposed to solve this problem in a variety of ways so that upon the malfunction of an ink jet head, printing is stopped, the printing apparatus recovers, or a similar step is performed based upon the detection of ink droplet condition. One such proposal provides a method for a detecting unsatisfactory flights of ink droplets by determining the presence of air bubbles in a pressure chamber by detecting the drive waveform of a piezoelectric element. Another proposal is a method for detecting an ink droplet speed, by detecting the current induced by a charged ink droplet which has been ejected by a nozzle.

These proposed methods suffer from disadvantages in that they provide a low detection sensitivity, need a high voltage to function or require a costly and complicated circuit. Accordingly, it is desirable to provide an ink droplet detecting apparatus which overcomes the shortcomings of the previously proposed methods of detection described above.

SUMMARY OF THE INVENTION

Generally speaking, in accordance with the present invention, an ink droplet detecting apparatus for use in an ink-on-demand type ink jet printer is provided. The ink droplet detecting apparatus comprises a first electrode spaced by a predetermined distance from a nozzle opposite thereto. When a conductive ink droplet ejected from the above nozzle reaches the first electrode, a predetermined change in resistance value between the first and a second electrode is detected. In another embodiment, the ink droplet detecting apparatus includes a first electrode disposed opposite an ink ejecting nozzle, and second electrode provided in an ink passage, a detecting circuit for detecting the impedance between the first and second electrodes.

Accordingly, it is an object of this invention to provide an improved ink droplet detecting apparatus.

Another object of the present invention is to provide an ink droplet detecting apparatus reliable in detection.

Still another object of the present invention is to provide an ink droplet detecting apparatus wherein a conductive ink droplet ejected from a nozzle renders a first and another electrode conductive therebetween to thereby detect whether or not the ink droplet reaches the first electrode and for detecting the flight condition of ink droplets.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description, taken in connection with the accompanying drawings, in which:

FIG. 3 is a timing chart of the voltages in the circuit of FIG. 2 in accordance with the invention;

FIG. 4 is a perspective view showing an ink droplet detecting apparatus in accordance with an alternative embodiment of the invention;

FIG. 5 is a front elevational view of an electrode substrate of an ink droplet detecting apparatus in accordance with a further alternative embodiment of the invention;

FIG. 6 is a front elevational view of an electrode substrate of an ink droplet detecting apparatus according to still another embodiment of the invention;

FIG. 7 is a top plan view of the ink jet heads and detecting apparatus of the embodiment shown in FIG. 6 applied to a color ink jet head;

FIG. 8 is a side elevational sectional view of an ink jet head and ink droplet detecting apparatus according to yet another embodiment of the invention;

DETAILED DESCRIPTION OF THE PREFERRED EMBODIMENT

Figure 1:
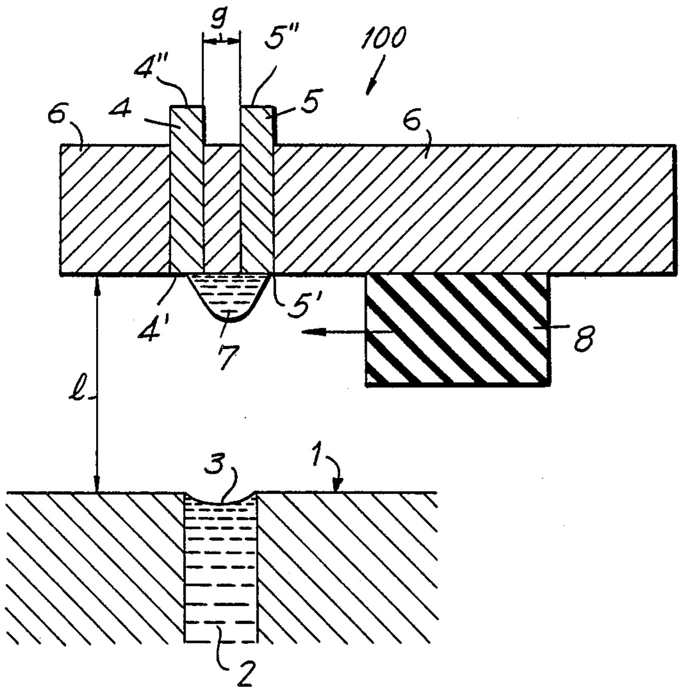
FIG. 1 is a sectional view of an end portion of an ink jet head and an ink droplet detecting apparatus in accordance with the invention.

Reference is made to FIG. 1, wherein a sectional view of an end portion of an ink jet head and an ink droplet detecting apparatus constructed in accordance with the invention is shown. An ink jet head, generally indicated as 1, has a nozzle 3 for ejecting conductive aqueous ink 2. An ink droplet detecting apparatus, generally indicated as 100 has an electrode substrate 6 which supports a first electrode 4 and a second electrode 5 so that the respective ends 4′ and 5′ of said electrode 4 and 5 face nozzle 3. Ends 4′ and 5′ of electrodes 4 and 5 are spaced from nozzle 3 by a distancce "l". The end 5′ of second electrode 5 is spaced by a distance "g" from the end 4′ of the first electrode. In the preferred embodiment distance "l" ranges from 0.2 mm to 1.2 mm, while distance "g" is approximately 0.1 mm, but this is by way of example only and may vary with the force applied at ink jet nozzle 3 and the size of each droplet. Electrodes 4 and 5 may be made by plating brass with gold and includes ends 4″ and 5″ respectively extending from the side of substrate 6 facing away from nozzle 3 for connection to a detecting circuit described below. Electrode substrate 6 is preferably made of a synthetic resin. Electrode substrate 6, together with ends 4′ and 5′ of electrodes 4 and 5, define a flat and smooth surface facing nozzle 3. An ink droplet 7 attaches to electrode substrate 6 so as to bridge electrodes 4 and 5 when ejected from nozzle 3, if the ink jet operates properly. A rubber wiper 8 is adapted to wipe the surface of electrode substrate 6 to clear the detecting apparatus for the next test.

Before nozzle 3 ejects ink droplet 7, no ink droplet exists on the surface of electrode substrate 6, therefore there is no conducting element between electrodes 4 and 5 and the resistance between them is considered to be infinite. Upon the driving of the piezoelectric element (not shown) of ink jet head 1, ink 2 is ejected from nozzle 3 and attaches to the surface of electrode substrate 6 in such a manner that ink droplet 7 renders electrodes 4 and 5 conductive after an elapse of a predetermined time. A detecting circuit (described below) detects changes in resistance value between electrodes 4 and 5, so that the difference between a good or bad flight condition of ink droplet 7 is detected. In the case of the bad condition, the detecting circuit generates a signal indicative of the bad flight of ink and also allows a head recovering means to recover the head. Then, ink droplet 7 is ejected again in order to detect whether ink flight condition is good or bad. If it is good, the usual print operation is started. However, if bad flights of ink droplets continue even after several repetitions of the head recovering operation, the printer is stopped and a malfunction is indicated. After each droplet 7 is transmitted and detection is complete, wiper 8 driven by a mechanism (not shown) slides on the surface of electrode substrate 6 for scraping away ink droplet 7. The ink droplet detection apparatus is thus restored to the initial condition and is ready for the next detection.

Figure 2:
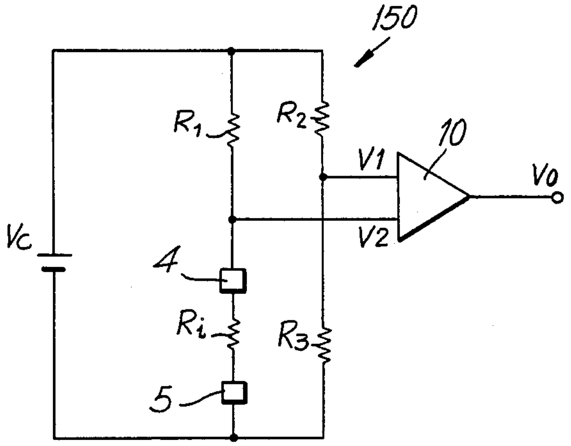
FIG. 2 is a circuit diagram of the detecting circuit in accordance with the invention shown in FIG. 1.

Reference is made to FIG. 2 which depicts a detecting circuit, generally indicated as 150 for detecting variations in resistance between electrodes 4 and 5.

Reference is now made to FIG. 2 in which a detecting circuit in the form of a bridge is shown. A voltage source Vc is coupled to two parallel circuit branches. The first branch consists of a resistor R1 coupled in series with electrode 4, which is in turn coupled to electrode 5, by ink droplet 7 when it is present. Ink droplet 7 is represented by a resistor Ri. The second branch consists of a second resistor R2 serially connected with a third resistor R3. A voltage comparator 10 has a first input $V_1$ from the junction between resistances R2 and R3 and a second input $V_2$ from the junction between electrode 4 and resistance R1.

Input $V_1$ of voltage comparator 10 is the voltage resulting from the division of power supply voltage Vc by the ratio of the resistance of resistor R2 to the resistance of resistor R3. Input $V_2$ of voltage comparator 10 is the voltage resulting from division of power supply voltage Vc by the ratio of the resistance of resistor R1 to the resistance of resistor Ri (and droplet 7). Voltage comparator 10 produces an output Vo, the polarity of which is reversible, depending on which of voltages $V_1$ and $V_2$ is higher. In this example, Vc=5 V, R2=R3=10 k ohm, and R1=2 k ohm. Resistance Ri is the resistance value between electrodes 4 and 5. Resistance Ri=∞ when no ink droplet is attached to electrode substrate 6, while Ri=1 k ohm when an ink droplet is attached there.

Figure 3A:
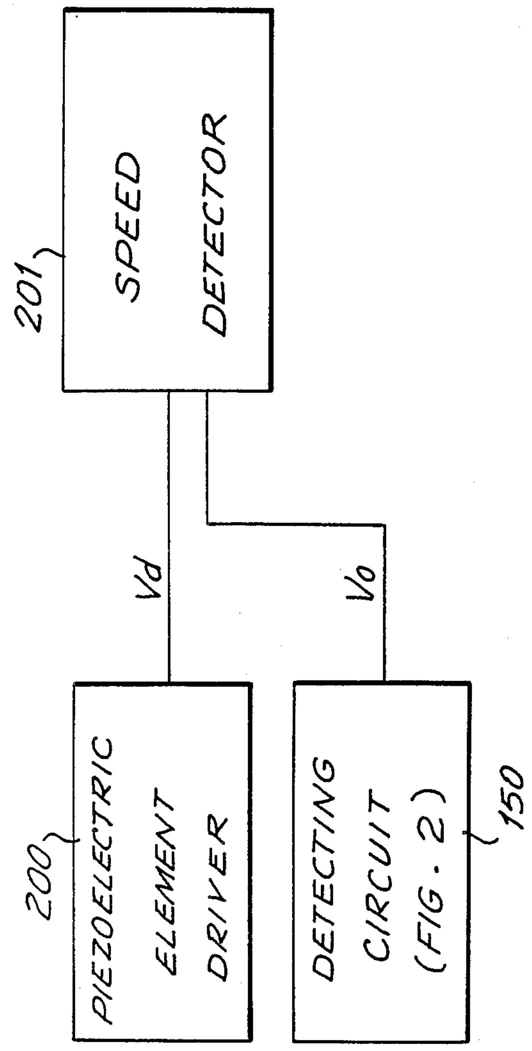
FIG. 3*a* is a block diagram of a speed detecting circuit in accordance with the invention.

Reference is now also made to the timing charts of FIG. 3 and the speed detecting diagram of FIG. 3*a*. Since the jet head according to this embodiment is driven by a so-called pulling-and-ejection method, voltage indicated at Vd is applied by a piezoelectric element driver 200 to the piezoelectric element in ink jet head 1. In this method, the volume of the pressure chamber in the head is not directly reduced for ink ejection. Rather, the volume of the pressure chamber is increased at time T1 to be supplied with ink and then, at time T2, i.e., after an elapse of a predetermined time, the volume of the pressure chamber is restored to the first condition causing ink to be ejected. Due to the values of resistors R1 and R2, the input $V_1$ equals $\frac{1}{2}$Vc. When ink droplet 7 ejected from nozzle 3 is attached to electrodes 4 and 5, input voltage $V_2$ of voltage comparator 10 is lowered from the value of power supply voltage Vc to the value Vc×Ri/(R1+Ri), which, at time T3, is less than input voltage $V_1$. As a result, output Vo of voltage comparator 10 is reversed at time T3. Therefore, as can be seen from FIG. 3 the flight time of ink droplet 7 may be calculated by comparing Vo and Vd. The time interval t between time T2 and time T3, the distance l and the flight speed v of an ink droplet have the following relation: roughly, $v=l/t$. Accordingly, the ink flight speed v is detected by speed detector 201 by comparing Vo and Vd; and counting the time t and if the resultant speed is under the predetermined speed, the ink flight is regarded as bad. If the lower limit of the ink flight speed v is set as vs, when output Vo of comparator 10 is not reversed after the elapse of the time ts ($ts=l/vs$), such ink flight is detected as being bad. For example, if l=1 mm and vs=2m/s, then ts=0.5 ms.

Reference is now made to FIG. 4 which illustrates an ink droplet detecting apparatus according to another embodiment of the present invention applied to a multi-nozzle ink jet head 1'. In this embodiment, electrode substrate 6' has a plurality of electrodes 4-1, through 4-9 and electrodes 5-1, through 5-9. However, since the group of electrodes 4-1 to 4-9 are electrically joined to each other at the back of electrode substrate 6', and the group of electrodes 5-1 to 5-9 are likewise electrically coupled at the back of electrode substrate 6', the structure is regarded as electrically equivalent to that having a pair of electrodes 4 and 5 as shown in FIG. 1. Ink jet head 1' has nine nozzles (not shown) respectively facing and corresponding to each respective electrode pair. For example, when an ink droplet 7-4 is ejected from the fourth nozzle, the flight condition of this ink droplet can be detected by detecting the resistance value between electrodes 4-4 and 5-4. According to this embodiment, it is possible to detect not only whether or not the ink reaches the first and second electrodes but also whether the ink droplet is flying at a lower speed than the standard speed, causing bad print quality. Therefore, not only the ink flight speed but also the ink flight direction can be detected. The electrodes disposed at intervals are sized to be as small as possible while still detecting only a normally flying droplet as good. Therefore, ink droplet 7-5 ejected from the fifth nozzle is detected as "bad" since it does not contact with electrode 4-5. When ink droplet 7-5 flies downwards and renders electrodes 4-6 and 5-6 conductive, this droplet is detected as good; however, such detection error is prevented by using the above ink flight detection in conjunction with the ink speed detection simultaneously.

In this embodiment, the series of electrodes 4 and the series of electrodes 5 are respectively coupled so that the detecting circuit shown in FIG. 2 may be used, and only one comparator is fully required even where a multi-nozzle head such as a 24-nozzle head is used. However, in order to strictly detect the ink flight direction as described above, respective electrode pairs may be provided with independent detection circuits so as to detect changes in resistance only between the electrodes which have received the ink droplet.

In this embodiment, since each nozzle's ejection is driven in turn to be independently detected, even if only one nozzle ejects ink abnormally, that abnormal ejection is detected and the recovery operation is started. Every time an abnormal ejection is detected, it is necessary to clean ink droplet 7 with wiper 8 shown in FIG. 1.

FIG. 5 illustrates an ink droplet detecting apparatus according to a further embodiment of the present invention, which detects droplets from an ink jet head having two rows of 8 nozzles, namely 16 nozzles in total. In this head, electrodes 14-1 to 14-9 are disposed on the left side and electrodes 14-9 to 14-17 are disposed on the right side. Electrodes 14-9 on both sides are connected and hence, regarded as one electrode. Electrodes 14-1 and 14-17 respectively correspond to electrodes 4 and 5 of the first embodiment. In this construction, when ink droplets 17-1 to 17-16 are ejected at the same time, if at least one ink droplet does not reach the corresponding electrode within the predetermined time, the ink flight condition is detected as "bad". Since ink droplet 17-4 is not attached between electrodes 14-4 and 14-5, the ink flight is detected as "bad". Thus, respective electrodes are rendered conductive in series through ink droplets so that the ink flight speed and direction of multiple nozzles are simultaneously detected. According to this embodiment, each gold electrode is separated from the other by a distance of approximately 0.2 mm and printed on electrode substrate 16 which is made from ceramic by screen printing. As shown in the present embodiment, the method for detecting in series whether each ink droplet reaches the corresponding electrode is suited for an ink jet head wherein the nozzles are disposed in a plurality of rows, the ink droplets are ejected at the same time, and do not overlap each other. However, when ink droplets ejected from respective nozzles simultaneously do overlap with each other as in an ink jet head with one vertical row of nozzles; ink is ejected from the odd nozzles at first, and then, the head is laterally moved and ejects ink from the even nozzles. In this way, the detection of ink droplets from all the nozzles is completed in two stages. Such a method allows substantially the same detection method as the method using the electrodes arranged in series of FIG. 5.

In the embodiment of FIGS. 4 and 5, the positional accuracy between electrode substrate 6 or 16 and ink jet head 1 is important. It is necessary to provide a mechanism for fitting the electrode substrate to the external shape of the nozzle face of ink jet head 1, or a mechanism for adjusting the position of the electrode substrate.

Referring to FIG. 6, showing an ink droplet detecting apparatus according to still another embodiment, comb-shaped electrodes 24, 25 are arranged with alternating teeth on electrode substrate 26, the respective teeth being separated by a smaller distance than the diameter of an ink droplet. Accordingly, whether an ink droplet 27 reaches electrode substrate 26 or not can be detected no matter where ink droplet 27 is attached, and therefore, positional accuracy between electrode substrate 26 and ink jet head 1 is not required. In this embodiment, ink droplet 27 has a diameter of 150$\mu$, while electrode 25 has a vertical separation distance P between teeth of 100$\mu$ and a lateral width of 2 mm.

Reference is now made to FIG. 7 which depicts the previous embodiment of the invention applied to a multi-color ink jet head. In this embodiment, the width W of electrode 25 is 20 mm and ink droplets ejected by 4 color ink jet heads 1-Y, 1-M, 1-C and 1-B can be detected by only one pair of electrodes 24, 25 on substrate 26.

Reference is now made to FIG. 8 which depicts a further alternative embodiment of the invention. An ink jet head 31 supplied with aqueous ink 32 has a nozzle 33 for ink ejection. An ink rod 37 is ejected from nozzle 33. A first electrode 34 facing nozzle 33 of head 31 is spaced from nozzle 33 by distance l. A coupling stylus 35 serves both to couple an ink container 36 to a plastic tube 39, and also serves as a second electrode. Tube 39 transports ink from container 36 to head 31. Reference numeral 40 is an air bubble which is generated in plastic tube 39, which however usually does not exist. Electrodes 34 and 35 are made of stainless steel. First electrode 34 is provided with a wiper 38 for cleaning its surface. Electrodes 34 and 35 correspond to electrodes 4 and 5 of the detecting circuit of FIG. 2; however, resistance Ri is approximately 500 K ohm, so that resistance R1 should be about 1 M ohm. The embodiment of FIG. 8 is particularly adapted to detect air bubbles in the ink flow path.

Figure 9:
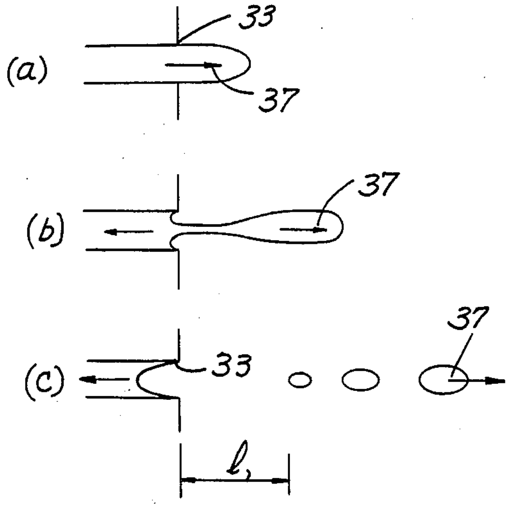
FIG. 9 is a side elevational sectional view depicting the formation of ink droplets in the embodiment shown in FIG. 8.

Reference is now made to FIG. 9 wherein the ink droplet flight condition in a usual ink-on-demand type ink jet head is depicted. First, ink 37 ejected from nozzle 33 extends like a rod as shown in FIG. 9(*a*). Secondly, ink 37 is constricted as shown in FIG. 9(*b*) as the pressure applied to the interior of the head is released. Finally, ink 37 is torn off and then flies as separate ink droplets because of its surface tension as shown in FIG. 9(*c*).

Ink jet head 31, once driven, effects ejection of ink rod 37 from nozzle 33 so that ink rod 37 extends and contacts electrode 34. At this time, a change in resistance value between electrodes 34 and 35 is detected. The detection waveform is substantially the same as that depicted in FIG. 3. However, at time T4, at which the output pulse of comparator 10 falls, ink rod 37 is constricted as shown in FIG. 9(*b*) and torn off.

Time period t in FIG. 3 is counted, whereby the speed of ink rod 37 and therefore the ink flight condition can be detected as described above in the first embodiment of the invention.

When air bubble 40 is generated in tube 39, it prevents the electric current flow between both electrodes, even if ink rod 37 normally renders electrode 34 conductive, so that ink rod 37 is detected as "bad". Therefore, before ink jet head 31 actually malfunctions in ink ejection because an air bubble has entered into the ink jet head, the bad ejection can be detected in advance. This results from the fact that on a prior good flight a "bad" detection will be produced.

In this embodiment, distance l is in the range from 200$\mu$ to 400$\mu$. If distance is less than 200$\mu$, the sensitivity in detection is lowered and it becomes difficult to distinguish whether the ink flight speed is high or low. If distance l is greater than 400$\mu$, the rod breaks off into a droplet before contact with electrode 34, so that detection cannot be performed.

Figure 10:
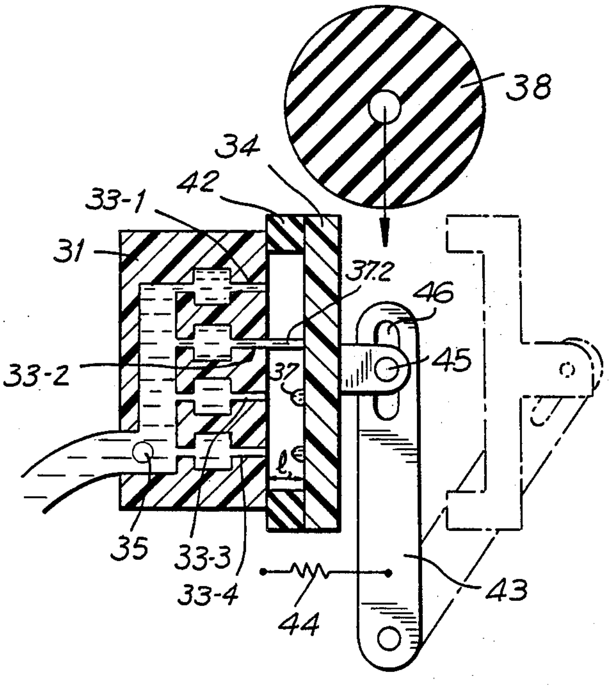
FIG. 10 is a side elevational sectional view of the embodiment of the invention shown in FIG. 8 applied to a multi-nozzle ink jet head including a mechanism for displacing the detecting apparatus.

Reference is now made to FIG. 10 which depicts a further embodiment of the invention having a multi-nozzle ink jet head. This embodiment is substantially equivalent in structure to that described above with the exception that: ink jet head 31 has four nozzles 33-1 to 33-4 and electrode 35 is positioned inside the flow path of ink; electrode 34 has stoppers 42 at both ends for accurately keeping distance l between the electrode and the nozzles. Furthermore, electrode 34 is angularly movably pressed against ink jet head 31 by a spring 44 acting through a pivotable lever 43. Electrode 34 is coupled to lever 43 by a pin 45 in slot 46 of said lever.

Ejection of ink rod 37 is done from nozzle 33-4 to nozzle 33-1 in turn. Since electrode 34 is rendered non-conductive after each conductive period for each respective nozzle, respective nozzles can be independently tested in turn even if ink remains on electrode 34. In addition, since the ink droplet is detected starting with bottom most nozzle 33-4, downward ink flow, even if it occurs, does not have any adverse effect on the detection of the nozzles located higher than the nozzles already tested. When the ink droplet detection is completed for nozzles 33-4 to 33-1, lever 43 is angularly moved by a cam (not shown) to be apart from ink jet head 31 as shown by phantom lines in FIG. 10. Subsequently, a roll-like wiper 38 made of sponge comes down to clean the ink droplets on the surface of electrode 34. The preparation for the next detection is thus completed.

In this embodiment, stoppers 42 are formed on electrode 34, however they may be formed on the head side. Namely, convex portions as stoppers may be formed on the periphery of the nozzle end faces without forming stoppers 42 on electrode 34. Thereby, the ink on the surface of electrode 34 can be easily cleaned off, and further, the convex portions also serve as means for preventing damage of the nozzle which may be caused by contact between the paper and the nozzles.

As mentioned above, according to the present invention, proper attachment of the ink droplet to the electrode can be detected by detecting changes in resistance between electrodes at least one of which is disposed opposite to the nozzle, so that the detecting apparatus may be very simple mechanically and electrically. Moreover, not only the ink flight speed but also the ink flight direction can be detected by setting up the configuration and arrangement of the electrodes in an appropriate manner. The ink droplet detecting apparatus of the present invention is further available to a multi-nozzle head without increase of the detecting circuit and therefore, widely applicable to a serial printer, line printer, plotter, telecopier and so on. In addition, the ink droplet detecting apparatus of the present invention may be used in a thermal ink jet printer wherein pressure is applied to ink by heat prior to ejection.

It will thus be seen that the objects set forth above, among those made apparent from the preceding description, are efficiently obtained and, since certain changes may be made in the above constructions without departing from the spirit and scope of the invention, it is intended that all matter contained in the above description or shown in the accompanying drawing shall be interpreted as illustrative and not in a limiting scenes.

It is also to be understood that the following claims are intended to cover all of the generic and specific features of the invention herein described and all statements of the scope of the invention which, as a matter of language, might be said to fall therebetween.

What is claimed is:

1. An ink droplet detecting apparatus for use in an ink-on-demand jet printer haaving a nozzle for ejecting an ink droplet comprising, a first electrode disposed at a predetermined distance from and facing said nozzle; a second electrode positioned so that an ink droplet reaching the first electrode changes the impedance value between the first and second electrodes; and a detection means for detecting changes in impedance between the first electrode and second electrodes, whereby ink flight condition is detected.

2. An ink droplet detecting apparatus as claimed in claim 1, wherein the second electrode is positioned a predetermined distance from and facing the nozzle and spaced from the first electrode so that a correctly positioned ink droplet will electrically coule the first and second electrodes.

3. An ink droplet detecting apparatus as claimed in claim 2, and including substrate means supporting said first and second electrodes.

4. An ink droplet detecting apparatus as claimed in claim 3, wherein each of said first and second electrodes extends through said substrate means and terminates in an end facing said nozzle, said substrate means and said electrode ends lying in essentially the same plane at least in the region of the ends of said first and second electrodes.

5. An ink droplet detecting apparatus as claimed in claim 4, wherein the other end of each of said first and second electrodes extends at least to a surface of substrate means for coupling to said detection means.

6. An ink droplet detecting apparatus as claimed in claim 1, wherein said detection means includes bridge circuit means, the impedance between said first and second electrodes defining one leg of said bridge, and comparator means coupled across said bridge circuit means for detecting changes in impedance between said first and second electrodes.

7. An ink droplet detecting apparatus as claimed in claim 6, further comprising a speed detection means for detecting the speed of said second ink droplet as it travels from said nozzle to said electrodes by measuring the time between actuation of said printer to eject an ink droplet and the droplet reaching the first and second electrodes.

8. An ink drolet detecting apparatus as claimed in claim 2, wherein said printer has a plurality of nozzles, and further comprising a plurality of electrode pairs having a first and second electrode, each respective electrode pair being positioned in spaced facing relation to one of said nozzles.

9. An ink droplet detecting apparatus as claimed in claim 8, wherein each of the first electrodes of the electrode pairs are electrically coupled together and each of the second electrodes of the electrode pairs are electrically coupled together, a single detection means being coupled to the coupled first and second electrodes.

10. An ink droplet detecting apparatus as claimed in claim 8, and including a substrate means supporting said first and second electrodes on a surface thereof facing said nozzle, the respective second and first electrodes of adjacent electrode pairs being electrically coupled together, whereby the ink droplets from the group of nozzles create a series connection between the electrodes associated with that group of nozzles for detection by said detection means.

11. An ink droplet detecting apparatus as claimed in claim 2, said first and second electrodes each consisting of a comb-shaped electrode, the teeth of the first and second comb-shaped electrodes being alternately interleaved, the interleaved teeth facing said nozzle.

12. An ink droplet detecting apparatus as claimed in claim 3, and including wiper apparatus for displacement along the surface of the substrate means for removing an ink droplet from the first and second electrodes after detection.

13. An ink droplet detecting apparatus as claimed in claim 1, and including wiper means displacable across said first electrode for removing an ink droplet after detection.

14. An ink droplet detecting apparatus as claimed in claim 1, wherein said second electrode is positioned in the path of the ink upstream of the nozzle, said detection means detecting a rod of ink from the nozzle reaching said first electrode.

15. An ink droplet detecting apparatus as claimed in claim 14, wherein said first electrode is spaced from the nozzle a distance selected so that said detection means detects a rod of ink from the nozzle reaching said first electrode.

16. An ink droplet detecting apparatus for use in an ink-on-demand jet printer having a nozzle for ejecting an ink droplet and an ink flow passage means for supplying ink to said nozzle comprising, a first electrode positioned in facing relation to and a predetermined distance from said nozzle; a second electrode positioned in said ink flow passage means; and a detecting means for detecting changes in impedance between said first electrode and said second electrode.

17. An ink droplet detecting apparatus as claimed in claim 16, wherein said detection means includes bridge circuit means, the impedance between said first and second electrodes defining one leg of said bridge, and comparator means coupled across said bridge circuit means for detecting changes in impedance between said first and second electrodes.

18. An ink droplet detecting apparatus as claimed in claim 17, further comprising a speed detection means for detecting the speed of said second ink droplet as it travels from said nozzle to said electrodes by measuring the time between actuation of said printer to eject an ink droplet and the droplet reaching the first and second electrodes.

19. An ink droplet detecting apparatus as claimed in claim 16, wherein the printer has a plurality of nozzles, said first electrodes facing each of said nozzles, said nozzles sharing, in part, a common ink flow passing means, said second electrode being positioned in the common ink flow passage means.

20. An ink droplet detecting apparatus as claimed in claim 16, and including wiper means displacable across said first electrode for removing an ink droplet after detection.

21. An ink droplet detecting apparatus as claimed in claim 16, wherein said first electrode is displacable to and from its operative position.

22. An ink droplet detecting apparatus as claimed in claim 16, and including spacer means mounted on one of the printer and first electrode for positioning the first electrode at the desired spaced relation to the nozzle.

23. An ink droplet detecting apparatus as claimed in claim 16, wherein said first electrode is displacable to and from its operative position.

* * * * *